(12) United States Patent
Morreale et al.

(10) Patent No.: US 9,631,493 B2
(45) Date of Patent: Apr. 25, 2017

(54) TURBO ENGINE COMPRISING A DAMPING FLUID FILM FOR DAMPING A GUIDE BEARING OF A SHAFT OF THE TURBO ENGINE AND METHOD OF ADJUSTING THE THICKNESS OF SUCH A DAMPING FLUID FILM

(75) Inventors: Serge Rene Morreale, Guignes (FR); Albert Vial, Le Chatelet en Brie (FR); Fabrice Chevillot, Epinay Sous Senart (FR)

(73) Assignee: SNECMA, Paris (FR)

( * ) Notice: Subject to any disclaimer, the term of this patent is extended or adjusted under 35 U.S.C. 154(b) by 520 days.

(21) Appl. No.: 14/240,152

(22) PCT Filed: Sep. 4, 2012

(86) PCT No.: PCT/FR2012/051974
§ 371 (c)(1),
(2), (4) Date: Feb. 21, 2014

(87) PCT Pub. No.: WO2013/034843
PCT Pub. Date: Mar. 14, 2013

(65) Prior Publication Data
US 2014/0193245 A1 Jul. 10, 2014

(30) Foreign Application Priority Data

Sep. 5, 2011 (FR) ...................................... 11 57836

(51) Int. Cl.
*F01D 25/16* (2006.01)
*F01D 1/04* (2006.01)
(Continued)

(52) U.S. Cl.
CPC ............. *F01D 1/04* (2013.01); *F01D 25/164* (2013.01); *F02C 7/06* (2013.01); *F16C 27/045* (2013.01);
(Continued)

(58) Field of Classification Search
CPC ........ F01D 25/164; F02C 7/06; F16C 27/045; F16F 15/0237; F05D 2240/50
See application file for complete search history.

(56) References Cited

U.S. PATENT DOCUMENTS 3,881,841 A 5/1975 Straniti
4,084,861 A * 4/1978 Greenberg ............ F01D 25/164
384/105
(Continued)

FOREIGN PATENT DOCUMENTS

DE  31 22 053  3/1982
EP  0 335 779  10/1989
(Continued)

OTHER PUBLICATIONS

International Search Report Issued Oct. 18, 2012 in PCT/FR12/051974 Filed Sep. 4, 2012.
(Continued)

*Primary Examiner* — Ninh H Nguyen
(74) *Attorney, Agent, or Firm* — Oblon, McClelland, Maier & Neustadt, L.L.P.

(57) ABSTRACT

A turbine engine including a casing, a turbine engine shaft extending axially, a guide bearing for guiding the turbine engine shaft in the casing, the guide bearing including an inner circumferential ring rigidly connected to the turbine engine shaft, an outer circumferential ring fitted in a housing of the casing, and gripping rolling members, and a damping cavity configured to receive a damping fluid to form a damping fluid film for damping the guide bearing, the cavity being delimited radially between an outer surface of the outer ring and an inner surface of the housing. The outer surface of the outer ring and the inner surface of the housing are conical surfaces.

20 Claims, 3 Drawing Sheets

(51) Int. Cl.
*F02C 7/06* (2006.01)
*F16F 15/023* (2006.01)
*F16C 27/04* (2006.01)

(52) U.S. Cl.
CPC ...... *F16F 15/0237* (2013.01); *F05D 2240/50* (2013.01); *F05D 2250/232* (2013.01); *Y10T 29/49229* (2015.01)

(56) References Cited

U.S. PATENT DOCUMENTS

| | | | |
|---|---|---|---|
| 4,392,751 A | | 7/1983 | Ida et al. |
| 4,429,923 A | * | 2/1984 | White ................... F16C 27/045 384/99 |
| 4,693,616 A | * | 9/1987 | Rohra ................... F01D 25/164 384/99 |
| 4,884,903 A | | 12/1989 | Pham et al. |
| 4,947,639 A | * | 8/1990 | Hibner ................... F01D 25/164 384/535 |
| 5,056,935 A | | 10/1991 | Singh |
| 5,215,384 A | | 6/1993 | Maier |
| 6,872,003 B2 | * | 3/2005 | Dusserre-Telmon . F01D 25/164 384/99 |

FOREIGN PATENT DOCUMENTS

| | | |
|---|---|---|
| JP | 57-1822 A | 1/1982 |
| JP | 11-501389 A | 2/1999 |
| JP | 2006-57653 A | 3/2006 |

OTHER PUBLICATIONS

Japanese Office Action issued Jul. 5, 2016 in Patent Application No. 2014-527724 (English Translation only).

\* cited by examiner

TURBO ENGINE COMPRISING A DAMPING FLUID FILM FOR DAMPING A GUIDE BEARING OF A SHAFT OF THE TURBO ENGINE AND METHOD OF ADJUSTING THE THICKNESS OF SUCH A DAMPING FLUID FILM

The present invention relates to the field of damping fluid films for damping a guide bearing of a turbine engine shaft and more specifically the adjustment of the thickness of such a damping fluid film.

The guide bearings used in a turbine engine comprise an inner ring and an outer ring gripping rolling members, for example balls or rollers. Conventionally, the outer ring is fitted so that it is rigidly connected to a fixed portion of the turbine engine casing and the inner ring is fitted so that it is rigidly connected to a shaft of the turbine engine, for example by press fitting. The bearing thus enables the shaft to be guided in rotation relative to the turbine engine casing.

In some configurations, the bearing is fitted between two rotary shafts of the turbine engine. This type of bearing is commonly referred to as an "inter-shaft" bearing, a bearing of this kind being known, for example, from patent application FR 2 939 843 A1 made by the company Snecma.

As an example, with reference to FIGS. 1 and 2, a turbojet engine for an aircraft conventionally has an intermediate casing 1 in which at least one low-pressure rotary shaft 2 is guided in rotation. With reference to FIG. 1, the low-pressure shaft 2 is guided at its upstream extremity in the intermediate casing 1 by an upstream guide bearing 6, known to the person skilled in the art as "bearing 1". The upstream guide bearing 6 has a radially external ring 62 fitted in an annular housing 11 of the casing 1. The outer ring 62 is furthermore joined in a rigidly connected manner to the intermediate casing 1 via a downstream plate 64 terminated at its downstream extremity by a radial flange 65 for fixing to the casing 1. The upstream guide bearing 6 also has an inner ring 61 rigidly connected to the low-pressure shaft 2 and rolling members 63 gripped by the rings 61, 62. In this example, the inner ring 61 is press-fitted to the low-pressure shaft 2 in such a way as to prevent any translation and any rotation of the inner ring 61 of the bearing 6 relative to the low-pressure shaft 2.

Similarly, with reference to FIG. 2, the low-pressure shaft 2 is guided at its downstream extremity in the intermediate casing 1 by a downstream guide bearing 6', known to the person skilled in the art as "bearing 5". The inner ring 61' of the upstream guide bearing 6' is press-fitted to the low-pressure shaft 2 while the outer ring 62' is fitted in a housing 11' of the intermediate casing 1 and has a link plate 64' with a radial fixing flange 65' enabling the outer ring 62' to be fixed in a rigidly connected manner to the casing 1 downstream from the rolling members 63' as shown in FIG. 2.

In order to damp the movements of the low-pressure shaft 2, the guide bearings 6, 6' each have a damping fluid film F trapped radially between the outer surface of the outer ring 62, 62' of the bearing 6, 6' and the inner surface of the housing 11, 11' of the intermediate casing 1 and trapped axially by compression rings. The compression rings, known to the person skilled in the art, advantageously make it possible to adjust the escape sections in order to obtain the desired fluid pressure in the damping fluid film for a low rate of flow of damping fluid.

A damping fluid film of a guide bearing, known to the person skilled in the art as "squeeze-film", improves the dynamic response of a turbine engine at a given operating speed. In particular, the damping fluid film limits the vibrations of the turbine engine shaft during operation.

The quality of the damping results mainly from the pressure of the damping fluid and from the radial thickness of the damping fluid film. During the design of a turbine engine, it is known to vary the pressure of the damping fluid film in order to determine the optimum damping. Given that the radial thickness of the damping fluid film depends largely on the geometry of the adjacent parts, in other words on the dimensions of the housing 11, 11' of the intermediate casing 1 and on the dimensions of the outer ring 62, 62' of the bearing 6, 6', it is not possible simply to adjust the radial thickness of the damping fluid film in order to determine the optimum damping. The only solution is to have available adjacent parts of differing diameters and to carry out tests with each one of them. Given the number of parts to be tested, the time taken to fit a part and the limited timescales for designing a turbine engine, it is in practice impossible to use tests to determine the optimum thickness of the damping fluid film for a given type of turbine engine.

A solution for overcoming this would be to determine the optimum thickness of the damping fluid film by calculation. In practice, calculations provide theoretical thicknesses that are inaccurate and do not allow optimum damping to be achieved. This is because the adjustment of the thickness of the damping fluid film must be performed accurately, as a variation in thickness from 0.1 to 0.2 mm alters damping performance significantly.

In order to eliminate at least some of these disadvantages, the invention relates to a turbine engine with a casing, a turbine engine shaft extending axially, a guide bearing for guiding the turbine engine shaft in the casing, the guide bearing having an inner circumferential ring rigidly connected to the turbine engine shaft and an outer circumferential ring fitted in housing means of the casing and gripping rolling members, a damping cavity, intended to receive a damping fluid in order to form a damping fluid film for damping the guide bearing, said cavity being delimited radially between an outer surface of the outer ring and an inner surface of the housing means, a turbine engine in which the outer surface of the outer ring and the inner surface of the housing means are conical surfaces.

Conical surface means a surface that is conical overall, and the surface can be cylindrical at at least one of its extremities.

Advantageously, the damping fluid film has a conical shape in order to guide the turbine engine shaft in the casing. By choosing the slope of the conical surfaces and/or the axial gap between the two conical surfaces, the thickness of the damping fluid film is, advantageously, adjusted, which enables damping to be optimised. The thickness of the damping fluid film can thus be adjusted without using operations to fit/remove the guide bearing, which saves time.

Preferably, the outer surface of the outer ring and the inner surface of the housing means are conical surfaces of revolution with substantially the same cone angle.

Thus, for a given axial gap, the radial thickness of the damping fluid film is constant between the two conical surfaces. In order to obtain the desired radial thickness, it is necessary merely to modify the axial gap between the two conical surfaces.

Preferably again, the turbine engine comprises means for adjusting the relative axial position of the outer surface of the outer ring of the bearing relative to the inner surface of the housing means. Incorporating such adjustment means into the turbine engine makes it simple and convenient to modify the thickness of the damping fluid film without replacing the main elements of the turbine engine, such as the casing or the guide bearing of the turbine engine. Damping measurements for a plurality of thicknesses can therefore be taken rapidly and efficiently and thus the optimum thickness can be determined.

According to an aspect of the invention, the adjustment means are fitted between the housing means and the casing. Thus, advantageously, in order to adjust the thickness of the damping fluid film, it is necessary merely to modify the axial position of the housing means relative to the casing. Preferably, the adjustment means include a shim placed between the housing means and the casing. A shim of this kind advantageously enables machining defects in the damping chamber to be compensated in such a way as to form a chamber of optimal volume to improve damping during operation.

According to another aspect of the invention, the adjustment means are fitted between the outer ring of the bearing and the casing. Thus, advantageously, in order to adjust the thickness of the damping fluid film, it is necessary merely to modify the axial position of the outer ring relative to the casing. Preferably, the adjustment means include a shim placed between the outer ring and the casing.

According to an aspect of the invention, the housing means have a circumferential housing ring fitted in an annular cavity of the casing, the housing ring comprising a longitudinal body the outer surface of which is in contact with the inner surface of the annular cavity of the casing and the inner surface of which is conical. In other words, the guide bearing is fitted in the annular cavity of the casing via the housing ring.

Preferably, the turbine engine has means for adjusting the axial position of the housing ring relative to the casing. By modifying the position of the housing ring in the annular cavity of the casing, the thickness of the damping fluid film is adjusted. Preferably, the adjustment means have a shim fitted removably to the housing ring. Thus, to adjust the thickness of the damping fluid film, it is necessary merely to combine the housing ring with a shim of a predetermined axial dimension.

Preferably, the shim and the housing ring are rigidly connected to the casing by at least one retaining bolt. The shim is thus easily removed from the housing ring Preferably, the housing ring has a radial flange, formed at a longitudinal extremity of the body, to which the adjustment means are fixed. Thus, the adjustment means enable the axial dimension of the radial flange to be increased, which modifies the axial position of the housing ring.

According to an aspect of the invention, the longitudinal body of the housing ring has a plurality of radial distribution orifices enabling the damping fluid film to be supplied. Preferably, the longitudinal body of the housing ring has an annular groove in which the plurality of radial distribution orifices is formed, the annular groove enabling the fluid to be distributed uniformly in the damping cavity.

Preferably, the turbine engine has at least one upstream compression ring and at least one downstream compression ring delimiting the damping cavity longitudinally.

According to another aspect of the invention, the housing means take the form of an annular cavity formed in the casing. In other words, the outer ring of the guide bearing is fitted directly in the turbine engine casing, without an intermediary.

The invention also relates to a method for adjusting the thickness of damping fluid film of a guide bearing of a turbine engine shaft in a turbine engine casing, the guide bearing having an inner circumferential ring rigidly connected to the shaft of the turbine engine and an outer circumferential ring fitted in housing means of the casing and gripping rolling members, a damping cavity, intended to receive a damping fluid in order to form a damping fluid film for damping the guide bearing, said cavity being delimited radially between an outer conical surface of the outer ring and an inner conical surface of the housing means, the method having a step of axial displacement of the outer ring relative to the housing means so as to modify the radial thickness of the damping fluid film.

Thus, it is unnecessary to replace the guide bearing of the turbine engine in order to modify the thickness of the damping fluid film. A large number of damping fluid film thicknesses can therefore be tested quickly.

According to an aspect of the invention, the method includes a step of positioning a shim between the housing means and the casing of the turbine engine.

According to another aspect of the invention, the method includes a step of positioning a shim between the outer ring of the guide bearing and the casing of the turbine engine.

The invention will be better understood on reading the description that follows, given solely as an example, and with reference to the appended drawings in which.

It should be noted that the drawings set out the invention in a detailed manner in order to implement the invention, and said drawings can of course be used to better define the invention where necessary.

Figure 1:
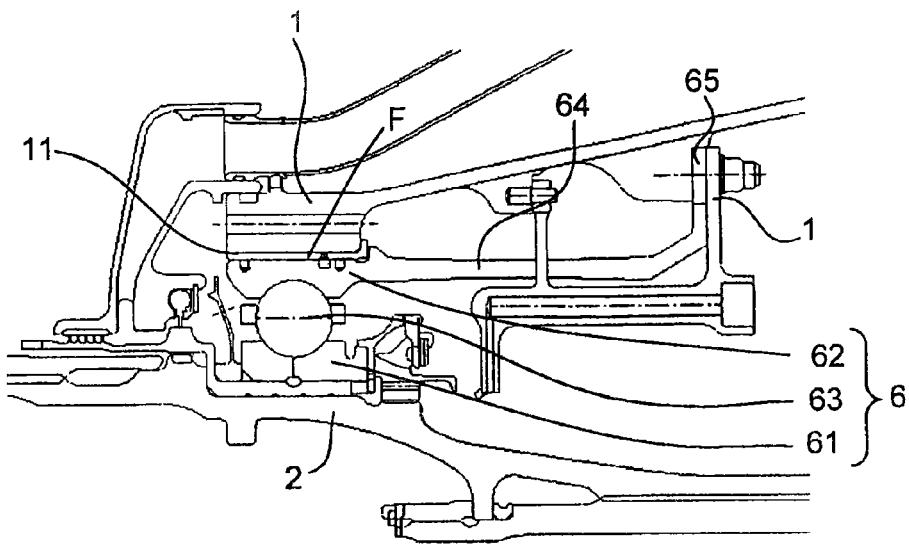
FIG. 1 is a diagrammatic view in cross-section of a turbine engine with an upstream guide bearing for a rotary shaft of a turbine engine (already commented on)
Figure 2:
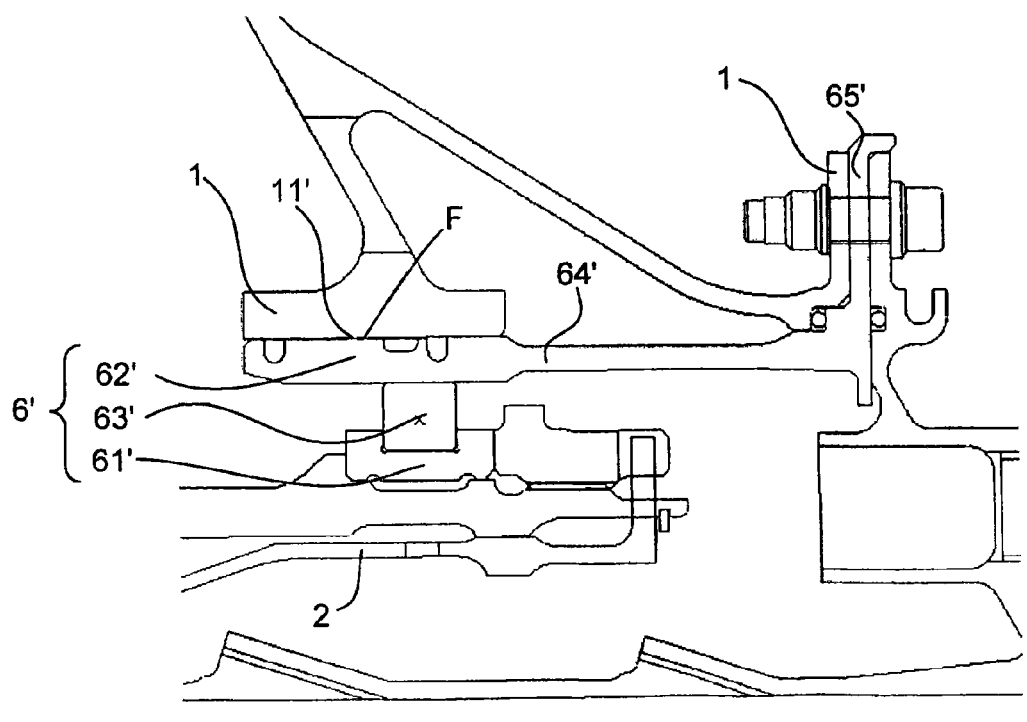
FIG. 2 is a diagrammatic view in axial cross-section of a turbine engine with a downstream guide bearing for a rotary shaft of a turbine engine (already commented on)
Figure 3:
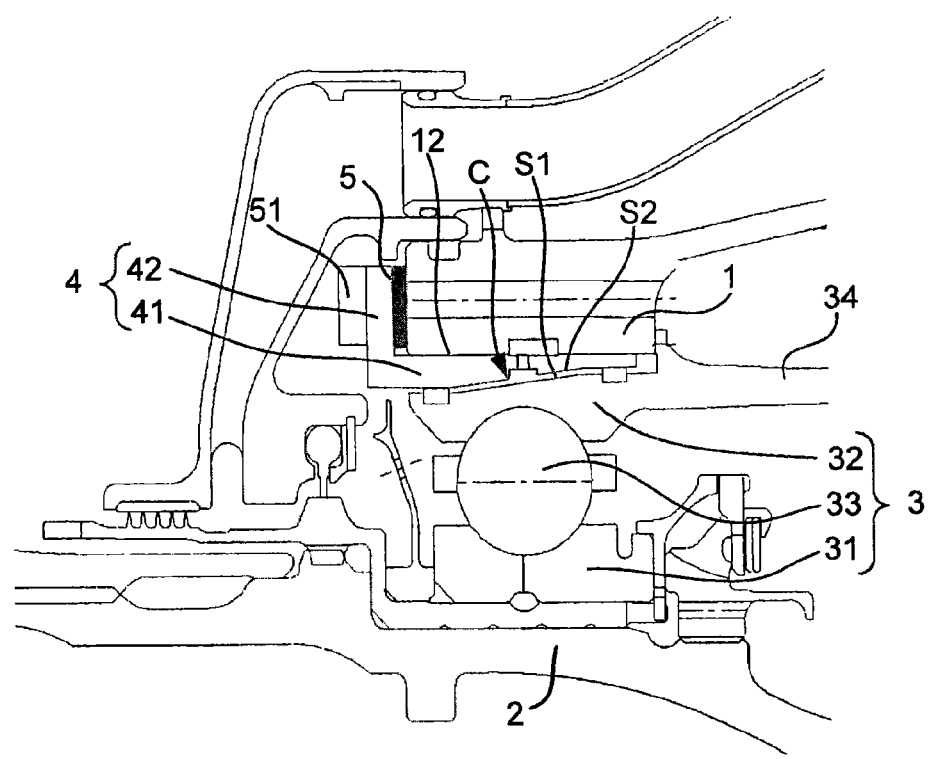
FIG. 3 is a diagrammatic view in axial cross-section of a first embodiment of a turbine engine according to the invention with a damping fluid film for damping an upstream guide bearing.
Figure 4:
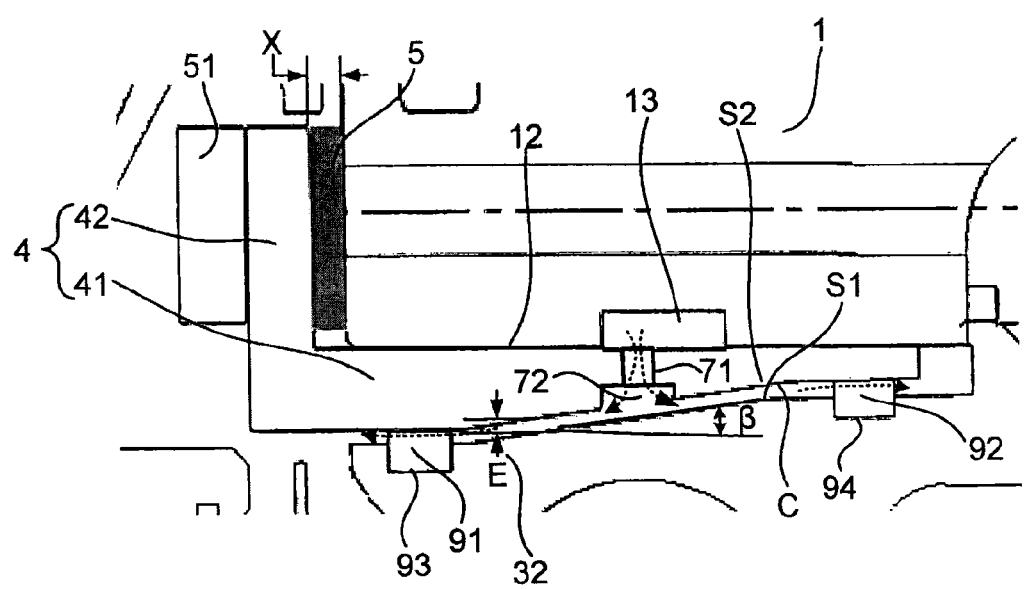
FIG. 4 is a close-up view of the damping fluid film of FIG. 3.
Figure 5:
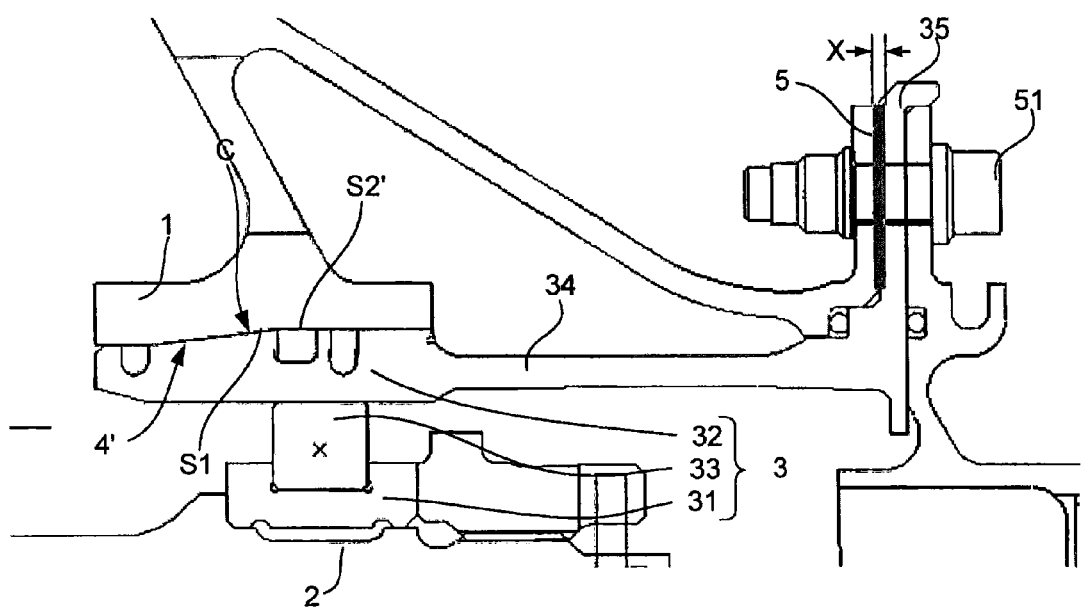
FIG. 5 is a diagrammatic view in axial cross-section of a second embodiment of a turbine engine according to the invention with a damping fluid film for damping a downstream guide bearing.

A first embodiment of a turbine engine according to the invention with an upstream guide bearing is shown in FIGS. 3 and 4, FIG. 5 showing a second embodiment of a turbine engine according to the invention with a downstream guide bearing.

In both embodiments, the turbine engine has an intermediate casing 1 in which at least one low-pressure rotary shaft 2 as previously presented is guided in rotation. The turbine engine has a guide bearing 3 fitted between the intermediate casing 1 and a low-pressure rotary shaft 2 to guide it in rotation. To that end, the casing 1 has means for housing the guide bearing 3 in the casing 1.

The guide bearing 3 and the housing means are configured together so as to arrange between them a damping cavity C in which there circulates a damping fluid in order to form a damping fluid film for damping the guide bearing 3, the radial thickness of which can be adjusted.

First Embodiment

According to the first embodiment, with reference to FIGS. 3 and 4, the guide bearing 3 has an inner circumferential ring 31 and an outer circumferential ring 32 gripping rolling members 33, for example balls or rollers. The guide bearing 3 shown in FIG. 3 has balls. The inner ring 31 of the bearing 3 is fitted rigidly connected to the low-pressure rotary shaft 2 of the turbine engine, for example by press-fitting. The radially internal surface of the inner ring 31 is cylindrical so that it can be slid externally to the low-pressure shaft 2 as shown in FIG. 3.

The outer ring 32 of the bearing 3 is fitted rigidly connected to the intermediate casing 1 via a plate 34 running longitudinally in a downstream direction. The plate 34 is preferably terminated at its downstream extremity by a radial flange for fixing to the casing 1. The radially external surface of the outer ring 32 is conical as shown in FIGS. 3 and 4. Preferably, the outer surface of the outer ring 32 is flared from upstream to downstream. In other words, the axial section of the outer surface of the outer ring 32 extends obliquely relative to the axis of the turbine engine as shown in FIG. 3.

The conical outer surface of the outer ring 32 of the bearing 3 is henceforth referred to as the first conical surface S1.

Housing Ring

According to the first embodiment, with reference to FIGS. 3 and 4, the outer ring 32 of the guide bearing 3 is fitted in the casing 1 via a housing ring 4.

The circumferential housing ring 4 has a longitudinal body 41 fitted in an annular cavity 12 of the intermediate casing 1. The longitudinal body 41 is terminated at its upstream extremity by a radial flange 42 extending radially outwards as shown in FIGS. 3 and 4, the radial flange 42 forming an annular crown upstream.

Still with reference to FIG. 3, the longitudinal body 41 of the housing ring 4 has an outer cylindrical surface, which is fitted so that it is in contact with the inner surface of the annular cavity 12 of the intermediate casing 1, and an inner conical surface which is opposite the first conical surface S1 of the outer ring 32 of the guide bearing 3.

The inner conical surface of the longitudinal body 41 of the housing ring 4 is henceforth referred to as the second conical surface S2.

Thus, the first conical surface S1 is fitted opposite the second conical surface S2 so that they radially delimit between one another a damping cavity C as shown in FIG. 4. This damping cavity C is circumferential and is intended to be supplied with damping fluid, preferably damping oil, in order to form a damping fluid film between the housing ring 4 and the guide bearing 3. Henceforth, with reference to FIG. 4, the thickness E of the damping cavity C is defined as the radial distance separating the conical surfaces S1, S2, the thickness E corresponding to the thickness of the damping fluid film during operation.

Preferably, the conical surfaces S1, S2 are conical surfaces of revolution, the cone angle of which is substantially equal. In this example, with reference to FIG. 4, the cone angle β of the conical surfaces S1, S2 is substantially equal to 2°.

Advantageously, when the housing ring 4 is translated in the axial direction, upstream or downstream, the thickness E of the damping fluid film is modified because of the conicity of the surfaces S1, S2 which radially delimit the damping cavity C. The adjustment of the thickness E of the damping fluid film according to the axial position of the housing ring 4 will be presented below.

In this example, the inner surface of the annular cavity 12 of the intermediate casing 1 has an annular groove 13 supplied with damping fluid as shown in FIG. 4. The housing ring 4 has a plurality of distribution orifices 71 extending radially through the longitudinal body 41 which enables the damping fluid to be brought from the supply groove 13 to the damping cavity C formed between the conical surfaces S1, S2. The conical surface S2 of the housing ring 4 has, in this example, an annular distribution groove 72 into which the distribution orifices 71 open in order to allow a uniform distribution of the damping fluid in the damping cavity C upstream and downstream from the distribution orifices 71.

With reference to FIG. 4, the turbine engine has upstream sealing means 91 and downstream sealing means 92 in the form of annular compression rings 91, 92, extending radially. The annular compression rings 91, 92 enable the damping chamber C to be delimited longitudinally and thus trap the damping fluid in a sealed manner. In this example, each annular compression ring 91, 92 has an escape section calibrated in such a way as to allow the damping fluid to leave the damping chamber C. Each annular compression ring 91, 92 includes in this example a radial slit (not shown) extending over an angular range of approximately 1° between the two extremities of the compression ring 91, 92. Thus, during operation, the damping fluid is renewed in the damping chamber C.

Preferably, the conical surface S1 of the outer ring 32 of the guide bearing 3 has at least two radial annular housings 93, 94 arranged to accommodate the compression rings 91, 92 respectively. Thus, the annular compression rings 91, 92 are capable of translating radially in their housings 93, 94 to allow the housing ring 4 to translate axially. In operation, the annular compression rings 91, 92 rest on the conical surface S2 of the housing ring 4 under the effect of centrifugal forces in order to delimit the damping chamber C longitudinally. Preferably, the outer surface of the outer ring 32 of the bearing 3 and the inner surface of the housing ring 4 have, at their longitudinal extremities, cylindrical portions between which the annular compression rings 91, 92 are fitted.

Advantageously, the housing ring 4 has means for adjusting the relative axial position of the conical surface S2 of the housing ring 4 relative to the conical surface S1 of the guide bearing 3. In this example, with reference to FIG. 3, the adjustment means take the form of a shim 5 removably fitted to the housing ring 4 and intended to be positioned between a downstream face of the radial flange 42 of the housing ring 4 and an upstream face of the intermediate casing 1. The shim 5 takes the form of a circular ring, the radial dimension of which is substantially equal to that of the radial portion 42 of the housing ring 4. The axial dimension X of the shim 5 allows adjustment of the axial position of the housing ring 4 relative to the intermediate casing 1 and thus relative to the outer ring 32 of the guide bearing 3 which is fitted rigidly connected to the intermediate casing 1.

The conicity of the surfaces S1, S2 which radially delimit the damping chamber C means that the thickness E of the damping fluid film is directly related to the axial dimension X of the shim 5. In this example, an axial displacement ΔX results in a modification of thickness ΔE of the damping fluid film in accordance with the following formula ΔE=ΔX·tan(β), in which β corresponds to the cone angle of the conical surfaces of revolution S1, S2.

The housing ring 4 and the shim 5 are joined to the intermediate casing 1 by a plurality of retaining bolts 51 running from upstream to downstream through longitudinal orifices in the housing ring 4 and the shim 5 in order to be received in retaining orifices arranged in the upstream face of the intermediate casing 1 on which the shim 5 rests, as shown in FIG. 4.

Adjustment Method

To increase the thickness E of the damping fluid film, an operator withdraws the retaining bolts 51 and removes the shim 5 in order to replace it with a shim 5 that has a larger axial dimension. To that end, the operator moves the housing ring 4 in an upstream direction in order to arrange a sufficient amount of axial space between the radial flange 42 and the casing 1. The axial translation in an upstream direction of the housing ring 4 leads to an increase in the radial thickness E of the damping fluid film because of the conicity of the surfaces S1, S2 radially delimiting the damping fluid film. The new shim 5 is fixed to the casing 1 with the housing ring 4 by tightening the retaining bolts 51 in the retaining orifices of the casing 1.

In operation, the damping fluid circulates from the supply groove 13 of the casing 1 towards the damping cavity C by passing into the distribution orifices 71 of the housing ring 4 as shown in FIG. 4. By virtue of the invention, the dynamic damping of damping fluid film for a plurality of damping fluid film thicknesses E can be measured rapidly and accurately. Likewise, in order to reduce the thickness E of the damping fluid film, it is necessary merely to use a shim 5 with a smaller axial dimension.

Second Embodiment

A second embodiment of the invention is described with reference to FIG. 5. The references used to describe elements whose structure or function is identical, equivalent or similar to the structure or function of the elements shown in FIGS. 3 and 4 are the same, to simplify the description. Furthermore, the entire description of the embodiment shown in FIGS. 3 and 4 is not repeated, this description applying to the elements shown in FIG. 5 where there are no incompatibilities. Only the noteworthy differences, structural and functional, are described.

As in the first embodiment, the turbine engine comprises a guide bearing 3 with an inner circumferential ring 31 and an outer circumferential ring 32 gripping rolling members 33 which are shown in FIG. 5 in the form of rollers. The outer ring 32 of the bearing 3 is fitted rigidly connected to the intermediate casing 1 via a plate 34 extending longitudinally in a downstream direction. The plate 34 is preferably terminated at its downstream extremity by a radial flange 35 for fixing to the casing 1. As in the first embodiment, the radially outer surface of the outer ring 32 is conical as shown in FIG. 5.

Unlike the first embodiment, in which the damping fluid film is formed between the outer ring 32 of the guide bearing 3 and a housing ring 4 rigidly connected to the casing 1, in the second embodiment of the invention, the damping fluid film is formed directly between the outer ring 32 of the guide bearing 3 and a cavity of the casing 1. In other words, with reference to FIG. 5, the intermediate casing 1 has an annular cavity 4', the inner surface S2' of which is conical so as to radially delimit, with the conical surface of the outer ring 32 of the bearing 3, a damping cavity C similar to that of the first embodiment.

In this second embodiment, the turbine engine has means for adjusting the axial position of the outer ring 32 of the guide bearing 3 relative to the intermediate casing 1. In this example, with reference to FIG. 5, the adjustment means take the form of a shim 5 removably fitted to the radial flange 35 of the outer ring 32. The shim 5 is placed between a radial fixing flange of the casing 1 and a radial fixing flange 35 of the outer ring 32 of the guide bearing 3. The axial dimension X of the shim 5 allows adjustment of the axial dimension of the radial fixing flange 35 of the outer ring 32 and thus of the axial position of the outer ring 32 of the guide bearing 3 relative to the annular cavity 4' of the casing 1.

The conicity of the surfaces S1, S2', which radially delimit the damping cavity C, means that the thickness E of the damping fluid film is directly related to the axial dimension X of the shim 5. As in the first embodiment, the shim 5 is joined to the casing 1 by retaining bolts 51.

To adjust the thickness E of the damping fluid film, an operator withdraws the retaining bolts 51 and removes the shim 5 in order to replace it with a new shim 5 with an appropriate axial dimension. Depending on the configuration of the turbine engine, a modification is made to the axial position of the housing means of the guide bearing and/or of the outer ring of the guide bearing.

The invention claimed is:

1. A turbine engine comprising:
    a casing including an annular cavity in which is fitted a circumferential housing ring with an outer surface in contact with an inner surface of the annular cavity of the casing;
    a turbine engine shaft extending axially;
    a guide bearing to guide the turbine engine shaft in the casing, the guide bearing including an inner circumferential ring rigidly connected to the turbine engine shaft and an outer circumferential ring fitted in the housing ring and gripping rolling members;
    a damping cavity, configured to receive a damping fluid that flows from a radially outer surface of the housing ring to a radially inner surface of the housing ring to form a damping fluid film to dampen the guide bearing, the damping cavity being delimited radially between an outer surface of the outer ring and the inner surface of the housing ring, the outer surface of the outer ring and the inner surface of the housing ring being conical surfaces; and
    a mechanism to adjust an axial position of the housing ring relative to the casing, the mechanism including a shim fitted removably to the housing ring.

2. A turbine engine according to claim 1, wherein the outer surface of the outer ring and the inner surface of the housing ring are conical surfaces of revolution with substantially a same cone angle.

3. A turbine engine according to claim 2, wherein the cone angle is substantially equal to 2°.

4. A turbine engine according to claim 1, wherein the shim and the housing ring are rigidly connected to the casing by at least one retaining bolt.

5. A turbine engine according to claim 1, wherein the housing ring includes a radial flange, formed at a longitudinal extremity of a body of the housing ring, to which the mechanism is fixed.

6. A turbine engine according to claim 1, wherein a longitudinal body of the housing ring includes a plurality of radial distribution orifices.

7. A turbine engine according to claim 1, wherein the damping cavity is configured to receive the damping fluid that flows from the radially outer surface of the housing ring to the radially inner surface of the housing ring through at least one distribution orifice in the housing ring.

8. A turbine engine according to claim 7, wherein the radially inner surface of the housing ring includes an annular distribution groove into which the at least one distribution orifice in the housing ring opens.

9. A turbine engine according to claim 7, wherein the at least one distribution orifice in the housing ring is axially positioned between an upstream seal and a downstream seal that seal the damping cavity.

10. A turbine engine according to claim 1, wherein the inner surface of the annular cavity of the casing includes an annular groove that is supplied with the damping fluid.

11. A method for adjusting a thickness of a damping fluid film to dampen a guide bearing of a turbine engine shaft in a turbine engine casing including an annular cavity in which there is fitted a circumferential housing ring including a radially outer surface in contact with an inner surface of the annular cavity of the casing, the guide bearing including an inner circumferential ring rigidly connected to the turbine engine shaft and an outer circumferential ring fitted in the housing ring and gripping rolling members, a damping cavity, configured to receive a damping fluid to form a damping fluid film to dampen the guide bearing, the cavity being delimited radially between an outer conical surface of the outer ring and an inner conical surface of the housing ring, the method comprising:

positioning a shim between the housing ring and the casing to axially displace the outer ring relative to the housing ring to modify a radial thickness of the damping fluid film in the damping cavity, and the damping fluid to form the damping fluid film flows from the radially outer surface of the housing ring to the inner conical surface of the housing ring.

12. A turbine engine comprising:

a casing including an annular cavity in which is fitted a circumferential housing ring with an outer surface in contact with an inner surface of the annular cavity of the casing;

a turbine engine shaft extending axially;

a guide bearing to guide the turbine engine shaft in the casing, the guide bearing including an inner circumferential ring rigidly connected to the turbine engine shaft and an outer circumferential ring fitted in the housing ring and gripping rolling members;

a damping cavity, configured to receive a damping fluid to form a damping fluid film to dampen the guide bearing, the damping cavity being delimited radially between an outer surface of the outer ring and an inner surface of the housing ring, the outer surface of the outer ring and the inner surface of the housing ring being conical surfaces; and a mechanism to adjust an axial position of the housing ring relative to the casing, the mechanism including a shim fitted removably to the housing ring, wherein a longitudinal body of the housing ring includes a plurality of radial distribution orifices.

13. A turbine engine according to claim 12, wherein the outer surface of the outer ring and the inner surface of the housing ring are conical surfaces of revolution with substantially a same cone angle.

14. A turbine engine according to claim 13, wherein the cone angle is substantially equal to 2°.

15. A turbine engine according to claim 12, wherein the shim and the housing ring are rigidly connected to the casing by at least one retaining bolt.

16. A turbine engine according to claim 12, wherein the housing ring includes a radial flange, formed at a longitudinal extremity of a body of the housing ring, to which the mechanism is fixed.

17. A turbine engine according to claim 12, wherein the damping cavity is configured to receive the damping fluid that flows from the outer surface of the housing ring to the inner surface of the housing ring through the radial distribution orifices.

18. A turbine engine according to claim 17, wherein the inner surface of the housing ring includes an annular distribution groove into which the radial distribution orifices open.

19. A turbine engine according to claim 17, wherein the radial distribution orifices are axially positioned between an upstream seal and a downstream seal that seal the damping cavity.

20. A turbine engine according to claim 12, wherein the inner surface of the annular cavity of the casing includes an annular groove that is supplied with the damping fluid.

* * * * *